Aug. 10, 1965 G. J. KING 3,199,227
PHONICS TEACHING DEVICE
Filed Nov. 29, 1961 2 Sheets-Sheet 1
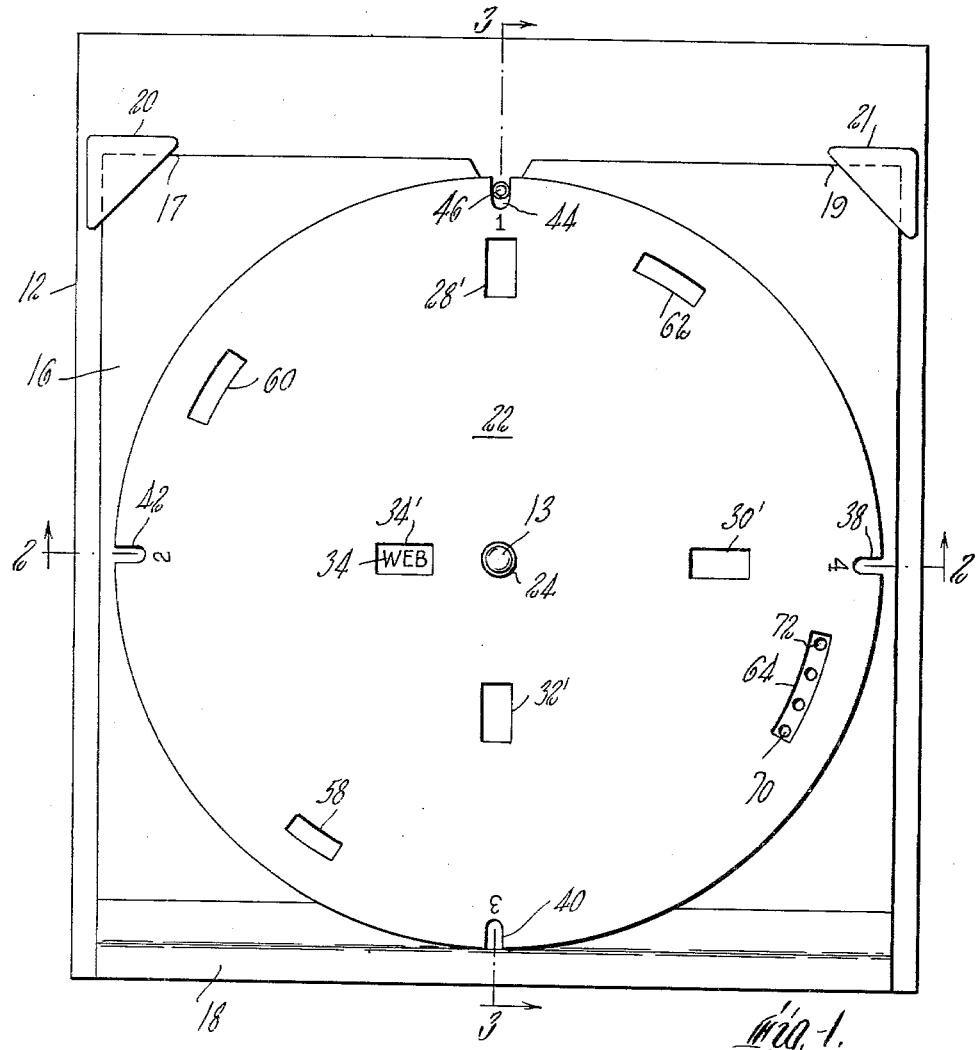
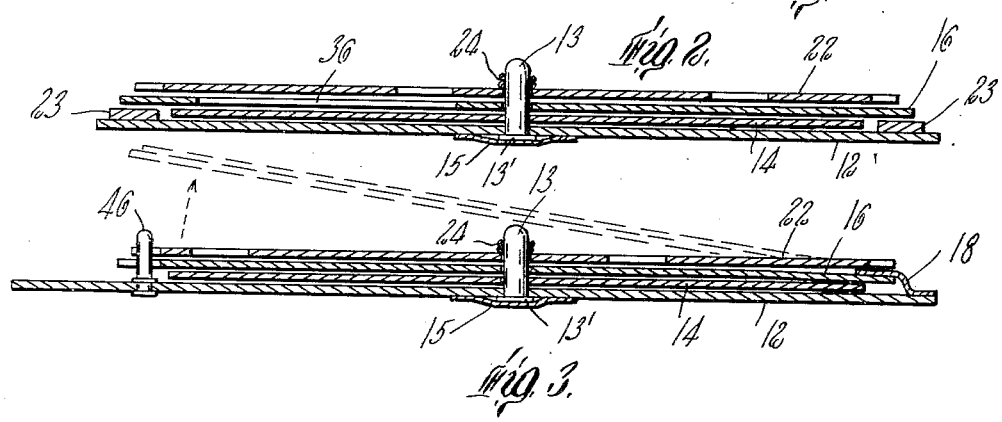

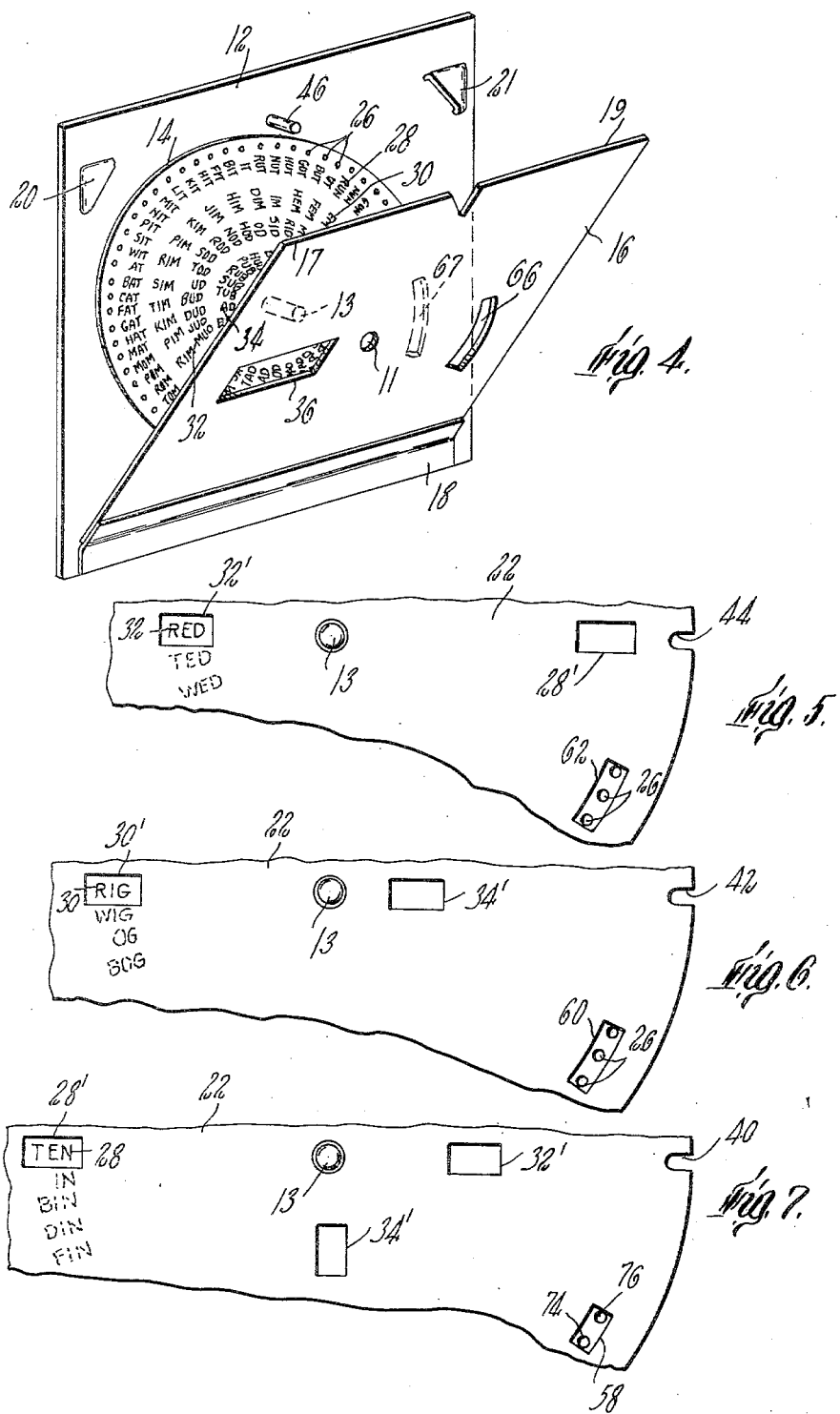

United States Patent Office 3,199,227
Patented Aug. 10, 1965

3,199,227
PHONICS TEACHING DEVICE
George J. King, Battle Ave., Castine, Maine
Filed Nov. 29, 1961, Ser. No. 155,745
6 Claims. (Cl. 35—35)

This invention concerns a device for teaching phonics.

Children from four to seven years of age have a vocabulary of thousands of words, but they are only on the threshold of learning to read. The most common method of teaching them reading now is that of the whole word memory method. By this a teacher pronounces the sound of the word as the children look at it, and by repetition, the sight of the word as a whole is committed to memory. Whatever the virtues of this system may be, it does not teach children how to examine the letters of words they have never seen before, to sound them out and thereby to discover for themselves how words which they already have in their vocabularies are written. With the present method the average rate of learning in the first three school grades is about 700 words a year, which fails utterly to encompass the large and growing vocabulary of the children.

In the past it was common to learn how to sound the letters of words out in the study of phonics, but that subject was regarded by children as dull and arduous and educators considered it difficult to teach.

In this method the child first learns the phonetic alphabet.[1] Then he drills by sounding out combinations of root sounds of two or three letters and various added letters. By repetition he develops a sure knowledge of the effect of change in the letters, and an ability to differentiate words which differ only by one or a few letters.

Phonics was taught in the past by presenting large columns of words to each child, who was told to study the columns. Since children are easily distracted, such columns were confusing to them. Moreover, the dry book of words that was used had a bad psychological impact making the child think the exercise a chore rather than fun. Many teachers continue to be willing to teach it and regard it as necessary to learning reading, spelling and writing well, but they are desperately in need of means to make its teaching and learning easier. Where schools fail to teach the subject, it is up to the parents to teach it or to the children to learn it by themselves if they are ever to have the knowledge.

Therefore, I have realized there has long been a need for a simple, reliable, and interesting device for teaching phonics, and it is a principal objective of this invention to satisfy this need.

One of the problems in providing a teaching device for the study of phonics is the need to display virtually hundreds of words. One of the features of my invention is a unique means for enabling a great number of words to be imprinted on a single sheet member, and for bringing each word into view of a child while all of the others are hidden. Another feature is that of enabling a child to adjust the device and actuate it so that words can be brought precisely into view in rapid succession.

Yet another feature of my invention is that almost all its parts are suitable to be formed of economical printed sheet materials, and it requires no machining or complex assembly.

These and other objects and features of the invention will be understood more fully in conjunction with the following description of a preferred embodiment and the drawings wherein:

FIG. 1 is a plan view of the embodiment;

FIG. 2 is a cross-sectional view taken on line 2—2 of FIG. 1, showing the sheets exaggerated in thickness and in their spacing for purposes of illustration;

FIG. 3 is a similar cross-sectional view taken on line 3—3 of FIG. 1;

FIG. 4 is a perspective view on a somewhat smaller scale of portions of the device;

FIGS. 5, 6 and 7 are views similar to FIG. 1 of the device adjusted to different settings, with portions of the device broken away.

Referring to FIGS. 1–4, the device comprises a baseboard member 12 of cardboard, for instance, from the front of which extends an axle 13 near the center thereof. Conveniently, the axle can have a flange 13' at one end; the axle can extend through a hole in baseboard 12 and the flange can be secured as by adhesive tape 15 or glue to the baseboard back. Next to the baseboard member is a word rotor 14 mounted and adapted to turn on the axle 13. This is conveniently a circular cardboard sheet member. Mounted over the word rotor is a lower mask member 16, an opaque sheet hingedly connected along its bottom edge to a corresponding edge of the baseboard member 12, for instance by a piece of flexible adhesive tape 18. This mask member has a hole 11 for the axle 13, and has upper edge portions 17 and 19 adapted to be engaged under holders 20 and 21 mounted on the baseboard, whereby they can be secured together to confine the word rotor. Spacer elements 23 mounted beyond the periphery of the word rotor, between this mask member and the baseboard prevent binding of the word rotor. An upper mask member, an apertured opaque disk 22, overlies the mask member 16 and has a hole through which axle 13 extends, the disk being rotatable thereon. It is held by a securing means at the outer end of the axle 13, here shown to be a rubber band 24 wrapped around the axle. As can be seen in FIG. 4, the word rotor 14 is an integral sheet member having at its periphery a multiplicity of equally spaced-apart holes 26 arranged in a circle centered on the axle. A series of concentric circular word arrays 28, 30, 32 and 34 are printed on the sheet member, each word therein being radially aligned with the axle 13, and in a special relationship to the holes at the periphery as will be explained below. A similar series of word arrays is printed on the opposite side of the rotor.

The lower mask member 16 has an aperture 36 which, in operative position, extends across each of the word arrays 28, 30, 32 and 34, and permits at least one word in each array to be seen.

The upper mask member 22 has a plurality of smaller apertures 28', 30', 32' and 34' corresponding to the word arrays, each disposed at the same radial spacing from the center as that of its word array. Each of these apertures is arcuately displaced from the others about their common center.

A plurality of spaced-apart notches 38, 40, 42 and 44 are provided in the edge of the upper mask member 22. A detent member 46, here a short pin, extends from the baseboard member and is adapted to engage the notches to restrain member 22 from movement. Each notch corresponds with one of the smaller apertures and is arcuately spaced therefrom the same distance that the detent member 46 is spaced from the aperture 36 in the lower mask member. Thus, when a notch is engaged with the detent, the corresponding smaller aperture is brought in line with the aperture 36, thereby enabling words in the corresponding word array to be seen. Adjustment from one word array to the next is accomplished by flexing the margin of mask disk 22 in the region of the detent, to enable the surface thereof to

---

[1] This amounts to learning the various sounds of each letter and the rules which ordinarily determine which sound is proper. In Why Johnny Can't Read, by Rudolf Flesch, the author sets forth a mode of teaching this in five pages, and states p. 32 that he has seen six-year olds learn it in a few months.

pass over the detent, and then turning the mask disk until the detent registers with the next notch. In FIG. 1 notch 44 is engaged with detent 46, bringing smaller aperture 34' into registry with large aperture 36 exposing word array 34 to view. In FIG. 5 word aperture 32' registers with aperture 36, notch 44 having been rotated away from the detent member, and notch 42 (see FIG. 1) brought into engagement with it. In FIG. 6 aperture 30' and in FIG. 7 aperture 28' has been moved into the corresponding position in the same manner.

Referring to FIG. 1, a plurality of arcuate stylus limit slots 58, 60, 62 and 64 cut in mask disk 22 are circularly arranged about the axle at the same radius as that of the holes 26 in the word rotor, each having opposite abutment surfaces adapted to stop a stylus. A large arcuate slot 66 is provided in the lower mask member 16 at the same radius and a corresponding slot 67 is preferably provided in the baseboard. Each slot in the disk member 22 is disposed at the same arcuate distance from one of the notches as the large slot 66 is spaced from detent 44. Accordingly, when any of the notches is engaged with the detent, its corresponding limit slot registers with the large slot 66 in mask member exposing holes 26 while the corresponding small aperture in the disk member 22 registers with the large aperture 36 in the lower mask member revealing a word therethrough.

In the position of FIG. 1, limit slot 64 registers with slot 66 in the lower mask member and exposes four holes. When a stylus such as a pencil is inserted in either of the holes 70 or 72 at one or the other end of the slot, and is moved until it is stopped by the opposite end, the word rotor 14 is turned an arc distance corresponding to the spacing between three holes, 12° where the spacing between holes is 4°. The words on the corresponding innermost array 34 are spaced at the same arc interval and aligned to be visible when the appropriate hole reaches the end of the slot. Thus, one word in the array can be precisely replaced by another one upon such actuation.

The arc spacing between words in an array spaced further out is decreased an angular increment equal to one or more arc spacings of the holes, and the corresponding limit slots are decreased in arc length by the same rule. Thus, in word array 28 the word spacing is equal to the angular distance between adjacent holes. When the disk member 22 is turned so that notch 38 engages the detent, aperture 28' registers with outer word array 28 and limit slot 58 registers with slot 66; then only two holes 74 and 76 (FIG. 7) are exposed because of the lesser length of slot 58.

Accordingly, four times as many words are placed on the outer array 28 as on the inner one 24. The number of arrays can be varied, five per side being the presently preferred number.

The invention enables the seeing of only one word at a time for any array while enabling the word spacing to vary from array to array so the needed large number of words can be placed on a rotor of practical size. It also enables accurate and rapid positioning of successive words.

The arrays comprise methodical arrangements of elementary phonetic syllables. For instance, in a first array, a series of three-letter words or syllables can be imprinted, in which the second and third letters are kept constant or unchanged and the *first* letter is varied from word to word, such as bad, dad, fad, had. By turning the rotor with the stylus, the words can be changed in the aperture so fast that no movement of the constant letters will be detected. As soon as the child learns to integrate the separate sound of the short "a" and the separate sound "d" into the combined sound ad, then he drills with the ad phonic set in which the preceding letter changes. By this he learns to integrate the sound of the changing preceding letter with the group ad to achieve three-letter sounds. Concurrently, he learns to differentiate between different three-letter words and sounds by recognizing the changed letters, e.g. he learns to differentiate bad from had. Similarly, in a second array there can be a series of three-letter words or syllables in which the first two letters are kept constant and the *third* letter rapidly varied, such as bad, bag, ban, bat; and in a third array the first and third letters can be held constant and the *middle* letter rapidly varied, such as bag, beg, big, bog, bug. From such phonic sets the child can thus learn the phonetic contribution of each letter to the ultimate sound and learns to differentiate three-letter groupings by their spelling. When, in the opinion of the parent or teacher, the child has a reasonably good grasp of three-letter combinations, my invention similarly provides a means of rapidly adding more letters resulting in combinations of four, five and six-letter words which he will rapidly learn to read, write and spell because here again, he learns the phonetic contribution of the added letters. Examples are: end, lend, blend, blender. My invention also permits the child, again by rapid variation of words in array to learn how these syllables are joined together to form the multi-syllable words, such as: all, alli, alliga, alligator; el, ele, eleva, elevator.

My invention permits the accomplishment of all the foregoing methodically, rapidly and precisely, without distraction, without confusion, and without having to guess. The child will not be exposed to the word House; and, upon seeing a picture of a horse on the page, read the word as horse; or see the word Elevator and read elephant, experiences which are all too common with the whole word memory method. My device enables the child to be taught how to read in a relatively short period of time because he has been taught the significance of each letter comprising the written word.

It will be appreciated that my device has the appearance of a game to a child, but in fact enables the teaching of phonetics rapidly, with a minimum amount of confusion of the child.

Numerous of the specific details of the invention can be varied within its spirit and scope.

What I claim is:

1. A device comprising a mounting means, an indicia-carrying member mounted by said mounting means on a center for rotation by successive increments, said indicia-carrying member having a plurality of circular arrays of indicia concentric about said center, adjustable masking means adapted to selectively mask said arrays of indicia so that a single indicium from a selected array can be seen, and a drive means that enables the engagement and rotary driving of said indicia-carrying member relative to said masking means to enable successive indicia in said selected array to be seen, said masking means comprising two superposable masking members, said device being specially constructed for use by a young child for learning phonics, a large number of successive indicia in each circular array comprising a phonic set, each indicium in a given set comprising a group of adjacent letters including a vowel, said drive means enabling said engagement and rotary driving of said indicia-carrying member including a multiplicity of stylus-engageable means arranged on said indicia-carrying member in a circle about said center, and relatively stationary limit slot means overlying at least two of said stylus-engageable means adapted to limit the movement of a stylus engaged with one of said stylus-engageable means to a predetermined arc equal to the arcuate spacing of successive indicia, the angular spacing between adjacent indicia in each array being equal, the angular spacing between indicia on the outer of said circular arrays being less than that of an inner one, said first masking member having an aperture extending across all of said circular arrays, and the second masking member having a plurality of smaller apertures selectively positionable one at a time over said aperture in said first masking member each at a radial distance corresponding to that of a different one of said arrays, and said second masking member being adapted to change the arc of said limit slot means when said second masking member is adjusted to change between said inner and outer arrays, said limit slot means including means defining a plurality of limit slots, one corresponding to each of said smaller apertures and having an angular extent corresponding with the angular spacing between indicia in the array corresponding to its aperture, each limit slot being adapted to be brought into stylus receiving position by the movement of said second member which aligns the corresponding smaller aperture with the aperture of the first masking member.

2. The device of claim 1 wherein said second masking member comprises a disk rotatable about said center, said second member defining said limit slots, said limit slots located on a circle corresponding in radius to that of said array of stylus-engageable means, said first masking member having a stylus slot defining the stylus receiving position into which the limit slots in said second masking member are adapted to be brought into registry, said first masking member being adapted to blank off all of said limit slots saving the one in registry with said stylus slot, concealing stylus-engageable means in the indicia-carrying member from view.

3. The device of claim 1 wherein said second masking member comprises a rotatable disk mounted to turn on said center relative to said first masking member, the smaller apertures thereof being positioned at radii from said center corresponding to the radii of said concentric indicia arrays, said second members defining a corresponding plurality of limit slots, said limit slots being all at the radius corresponding to that of the circle of said stylus-engageable means and each being angularly spaced apart from the others relative to said center, said disk having a plurality of catch means around its periphery, a detent mounted stationary with respect to said first masking member at a point near the periphery of said second masking member, adapted to engage said catch means, each of said catch means corresponding with and positioned relative to one of said smaller apertures so that when the former is engaged by said detent the latter is aligned with the large aperture of the first masking member, and the corresponding limit slot positioned to receive the stylus.

4. The device of claim 3 wherein said mounting means comprises a baseboard member on the side of said indicia-carrying member opposite from said masking means, and said indicia-carrying member and said masking means are secured together by an axle mounted on said baseboard member and extending through the center of relative rotation, said baseboard member having a slot through which said stylus can extend when inserted in the stylus-engageable means of said indicia-carrying member, each of the limit slots of said second mask member being aligned with said slot in said baseboard member when the respective catch means is engaged with said detent.

5. The device of claim 4 wherein said detent member comprises a short pin, said plurality of catch means on said disk member comprises a plurality of notches in the edge thereof and said disk member comprises a flexible sheet adapted to have its marginal portion flexed to a level above that of the end of the pin, thereby enabling the notch to be disengaged from the detent and the disk member moved, without interference by said detent, to position a successive notch at said detent.

6. A device comprising a mounting means, an indicia-carrying member in the form of a rotatable sheet member mounted to turn about a center on said mounting means, said indicia-carrying member having at least one row of equally spaced apart indicia affixed in a circular array about said center, masking means attachable to said mounting means and adapted to selectively mask said row of indicia so that a single indicium from said row can be seen through an aperture provided by said masking means, and drive means enabling the engagement and driving of said indicia-carrying member relative to said masking means to cause successive indicia in said row to be seen through said aperture, said drive means comprising a multiplicity of equally arcuately spaced apart stylus-engageable drive means arranged in a circle about said center, said device being specially constructed for use by a young child for learning phonics, a large number of successive indicia in said row comprising a phonic set, said indicia-carrying member having a multiplicity of said phonic sets, each indicium in each given set comprising a group of adjacent letters including a vowel, at least one of said letters being the same in each indicium in said set, said letters in said indicia that are the same being so located with respect to said indicia-carrying member that they travel through the same path relative to said masking means with movement of said indicia-carrying member, relatively stationary locating stop means for limiting each movement of said indicia-carrying member to a given amount, said locating stop means comprising a limit slot overlying at least two of said stylus-engageable drive means and having end abutment surfaces adapted, for a stylus engaged with a stylus-engageable means at one end of the said slot, to limit the movement from said end to the opposite end of said slot, to a predetermined arc equal to the arcuate spacing of adjacent indicia in said selected array whereby the letter that is the same in successive indicia, and is located with respect to said indicia-carrying member to travel through the same path, can be identically positioned in said aperture upon movement of said indicia-carrying member by said stylus, said device thereby adapted when said child moves said indicia-carrying member to precisely position adjacent successive indicia in the manner that the letter which said successive indicia have in common is stopped at the same place whereby the fact that said letter is the same in successive indicia is drawn to the attention of the child as an aid in the phonic exercise, and whereby the novelty of the illusion that the same letter did not even move when the indicia-carrying member is moved sufficiently first from one indicium to the next enables the child to enjoy the exercise, wherein a plurality of rows of indicia are affixed to said indicia-carrying member in concentric circular array about said center, means enabling said masking means to be adjustable to a plurality of selected positions to reveal an indicium in selected arrays, means enabling the effective angular extent of said limit slot means to be automatically variable dependently with adjustment of said masking means between said selected positions, said limit slot means thereby adapted to dependently change the arc of permitted movement of said stylus to correspond with the array selected by said masking means, the angular spacing between adjacent indicia in each array being equal, and the angular spacing between indicia on the outer of said circular arrays being less than that of the inner one, each said spacing being an even multiple of the arc between adjacent stylus-engageable means for each of said selected arrays determnied by the selected position of said masking means, the automatically controlled angular extent of the limit slot means corresponding to the angular spacing between successive indicia in said array.

References Cited by the Examiner

UNITED STATES PATENTS

| | | | |
|---|---|---|---|
| 1,139,329 | 5/15 | Birch | 35—74 |
| 1,453,100 | 4/23 | Fulgora | 235—88 |
| 1,694,877 | 12/28 | Hutchings | 235—78 |
| 2,231,751 | 2/41 | De Beers | 120—24 |
| 2,427,976 | 9/47 | Posson | 235—88 |
| 2,674,410 | 4/54 | Bernstein | 235—88 |
| 3,036,386 | 5/62 | Seligmann | 35—74 XR |

JEROME SCHNALL, *Primary Examiner.*

LEONARD W. VARNER, LAWRENCE CHARLES, LEO SMILOW, *Examiners.*